(12) United States Patent
Kokawa et al.

(10) Patent No.: US 8,235,443 B2
(45) Date of Patent: Aug. 7, 2012

(54) PICK-UP STYLE UTILITY VEHICLE WITH EXPANDABLE CARGO BED

(75) Inventors: Manabu Kokawa, Akashi-shi (JP);
Satoshi Morotomi, Akashi-shi (JP);
Daisuke Takagi, Kakogawa-shi (JP);
Naohisa Masuda, Kobe-shi (JP);
Shigeru Yamashita, Akashi-shi (JP);
Masahiro Kawahara, Kobe-shi (JP);
Hirokazu Morita, Kakogawa-shi (JP);
Masashi Sakata, Kobe-shi (JP);
Hideyuki Kato, Akashi-shi (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 280 days.

(21) Appl. No.: 12/649,839

(22) Filed: Dec. 30, 2009

(65) Prior Publication Data
US 2011/0156425 A1 Jun. 30, 2011

(51) Int. Cl.
*B62D 33/08* (2006.01)
(52) U.S. Cl. .................................. 296/26.09; 280/748
(58) Field of Classification Search .............. 296/24.43, 296/24.11, 26.09, 26.08, 26.1, 26.11, 63, 296/65.01, 66, 65.05, 65.09, 183.1, 186.4; 280/748, DIG. 5; *B62D 33/08*
See application file for complete search history.

(56) References Cited

U.S. PATENT DOCUMENTS

| | | | |
|---|---|---|---|
| 3,169,792 A * | 2/1965 | Solano Viquez | 296/99.1 |
| 6,905,159 B1 | 6/2005 | Saito et al. | |
| 6,994,388 B2 | 2/2006 | Saito et al. | |
| 7,249,798 B2 | 7/2007 | Saito et al. | |
| 7,316,440 B2 * | 1/2008 | Walter et al. | 296/37.16 |
| 2003/0141731 A1 * | 7/2003 | Betts et al. | 296/24.1 |
| 2007/0013201 A1 * | 1/2007 | Wagner et al. | 296/24.43 |

* cited by examiner

*Primary Examiner* — Glenn Dayoan
*Assistant Examiner* — Pinel Romain
(74) *Attorney, Agent, or Firm* — Wenderoth, Lind & Ponack, LLP

(57) ABSTRACT

A pick-up style utility vehicle has a front seat and a rear seat surrounded by a cabin frame, and a cargo bed in this order from the vehicle front, a screen shield partitioning the cargo bed and a riding space in front of the cargo bed. The cargo bed is changeable between an expanded state in which the cargo bed is expanded into the riding space of the rear seat and a non-expanded state not occupying the riding space of the rear seat. The screen shield is supported by the upper portion of the cabin frame and is changeable between an expanded position in which the cargo bed and the riding space in front of the cargo bed are partitioned and a non-expanded position in which the cargo bed and the riding space in front of the cargo bed are partitioned without the necessity of detaching the screen shield from the cabin frame.

3 Claims, 17 Drawing Sheets

PICK-UP STYLE UTILITY VEHICLE WITH EXPANDABLE CARGO BED

BACKGROUND OF THE INVENTION

1. Field of the Invention

The present invention relates to a pick-up style utility vehicle which can expand a cargo bed in a front direction so as to optimize an area or capacity of a cargo bed space or a passenger space according to user demands.

2. Description of the Related Art

At present, utility vehicles of various styles are used. Other than a pick-up style utility vehicle with a relatively large cargo bed behind a seat, there is a straddle-type all terrain vehicle having a handle bar, or the like.

Typically, the pick-up style utility vehicle is more practical than the handle bar type utility vehicle belonging to the straddle-type all terrain vehicle. The pick-up style utility vehicle is used for hunting in fields and mountains, conveyance of lumber, movement in golf courses, golf course maintenance, and the like.

The present applicants have formerly developed inventions relating to the pick-up style utility vehicle with a cargo bed whose area or capacity can be expanded. Their applications have been filed, which resulted in, for example, U.S. Pat. Nos. 6,905,159; 6,994,388; and 7,249,798.

A configuration of the pick-up style utility vehicle disclosed in the respective documents has a front seat including a driver's seat, a rear seat, and a cargo bed in this order from the front of the vehicle. The rear seat can be changed between a used state and a retracted state to switch between a 2 passengers transformation and a 4 passengers transformation. In the 2 passengers transformation, a front portion of the cargo bed can be expanded into a riding space occupied by the rear seat in the used state.

Typically, a screen shield is provided at the front end of the cargo bed of the pick-up style utility vehicle so as to prevent a load loaded on the cargo bed from moving into the riding space in front of the cargo bed. The position of the screen shield must be changed between the 2 passengers transformation expanding the cargo bed in a front direction, and the 4 passengers transformation not expanding the cargo bed.

FIG. 20 shows an example of the expandable cargo bed disclosed in the related art documents. A cargo bed 400 has a stationary bottom plate 401, right and left stationary side panels 402, a pair of right and left expandable side panels 404 provided at the front ends of the stationary side panels 402 and rotatably supported about hinge shafts 403, an expandable bottom plate 405 provided at the front end of the stationary bottom plate 401, and a front panel 406. A screen shield 407 is integrally formed with the front panel 406.

Pins 410, for positioning and fixing, protrude in a downward direction and are provided at the right and left ends of the screen shield 407. Pin insertion holes 411 and 412 into which each of the pins 410 of the screen shield 407 can be inserted are formed in the upper surface of the end of each of the expandable side panels 404 and the upper surface of the front end of each of the stationary side panels 402.

As indicated by the solid lines in FIG. 20, when the expandable side panels 404 are closed (4 passengers transformation), the screen shield 407 is located at the front ends of the stationary side panels 402 and the pins 410 of the screen shield 407 are inserted into the pin insertion holes 412 of the stationary side panels 402 from above. As indicated by the imaginary lines, when the expandable side panels 404 are opened in a front direction (2 passengers transformation), the screen shield 407 is located at the front ends of the expandable side panels 404 and the pins 410 of the screen shield 407 are inserted into the pin insertion holes 411 of the expandable side panels 404 from above.

With the above configuration, the screen shield 407 is moved between an expanded position when the cargo bed 400 is expanded and a non-expanded position when the cargo bed 400 is not expanded. It is necessary to lift the screen shield 407 together with the front panel 406 to pull out the right and left pins 410 from the pin insertion holes 411 or 412. The screen shield 407 and the front panel 406 are then integrally moved in a rear or front direction. After the movement, the pins 410 are again inserted into the pin insertion holes 412 or 411 from above.

However, a weight of the screen shield 407 and the integral front panel 406 is large, and a width of the screen shield 407 extends throughout the substantially whole width of the cargo bed 400. Therefore, it is very difficult for one person to move the screen shield 407. Accordingly, at present, the screen shield 407 is lifted by grabbing the right and left ends of the screen shield 407 and the front panel 406 by two operators to pull out the pins 410. After the movement, the pins 410 must be inserted into the pin insertion holes 411 or 412 again. Thus, it takes a substantial amount of time to move the screen shield 407.

SUMMARY OF THE INVENTION

The present invention has been made in view of the above problems and an object of the present invention is to simplify expanding and contracting operations of a cargo bed and a moving operation of a screen shield therewith, thereby performing the operations easily and immediately even by one operator.

To achieve the above object, the present invention provides a pick-up style utility vehicle having a front seat and a rear seat surrounded by a cabin frame, and a cargo bed in this order from the front of the vehicle, a screen shield partitioning the cargo bed and a riding space in front of the cargo bed, and the cargo bed being changeable between an expanded state in which the cargo bed is expanded into the riding space of the rear seat and a non-expanded state not occupying the riding space of the rear seat. The screen shield is supported by an upper portion of the cabin frame and is changeable between an expanded position in which the cargo bed in the expanded state and the riding space in front of the cargo bed are partitioned and a non-expanded position in which the cargo bed in the non-expanded state and the riding space in front of the cargo bed are partitioned without being detached from the cabin frame.

With the above configuration, in the operation of expanding or contracting the cargo bed, the screen shield is changeable between the expanded position and the non-expanded position without being lifted and moved. That is, the position of the screen shield can be easily changed by one operator.

According to the present invention, preferably, the screen shield is supported by the upper portion of the cabin frame so as to be slidable forward and rearward. In this case, a rail extended forward and rearward is provided on the upper portion of the cabin frame and the upper end of the screen shield is slidably supported by the rail.

With the above configuration, the screen shield can be easily moved even in the state in which the operator is on the cargo bed or stands on the right or left side of the vehicle. In particular, the provision of the rail can smooth the movement of the screen shield.

According to the present invention, the following configuration can be adopted as the supported configuration of the screen shield. The screen shield has engaging portions which can engage the cabin frame at both ends in a direction orthogonal to a vehicle width direction, in which one engaging portion rotatably engages the upper portion of the cabin frame in the expanded position and the other engaging portion rotatably engages the upper portion of the cabin frame in the non-expanded position.

With the above configuration, when moved, the screen shield is rotated with one engaged portion of the cabin frame as a rotational fulcrum so as to engage the other engaged portion and is detached from the one engaging portion. Therefore, the screen shield can be easily moved.

According to the present invention, preferably, a backrest for the rear seat is provided on the screen shield, and the backrest is located as the headrest for the front seat above a backrest for the front seat when the screen shield is in the expanded position.

With the above configuration, the backrest for the rear seat can serve as the headrest for the front seat. Thus, the number of components can be reduced.

According to the present invention, when the rail for moving the screen shield is provided, at least any one of the front end and the rear end of the rail can be bent downward.

With the above configuration, when moved to the front end or the rear end, the screen shield is lowered so as to be automatically positioned in the expanded position or the non-expanded position.

According to the present invention, in addition to the expanded position and the non-expanded position, the screen shield is changeable to a third position in which the screen shield is held on the upper portion of the cabin frame in a fallen state.

With the above configuration, the screen shield fixed into the third position can be used as the roof of the cabin frame.

DETAILED DESCRIPTION OF THE PREFERRED EMBODIMENTS

First Embodiment of the Present Invention

Figure 1:
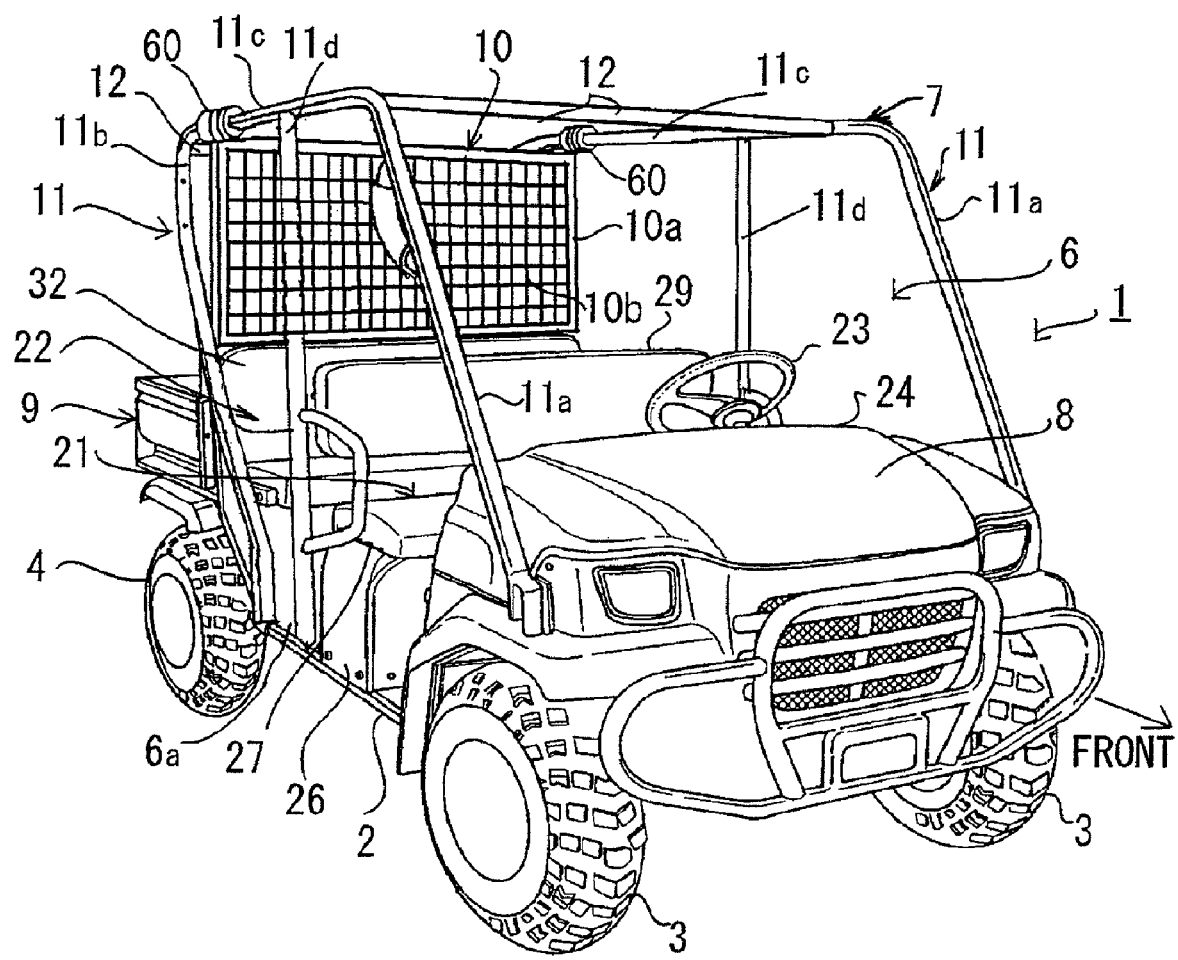
FIG. 1 is an overall perspective view of a pick-up style utility vehicle according to a first embodiment of the present invention.
Figure 2:
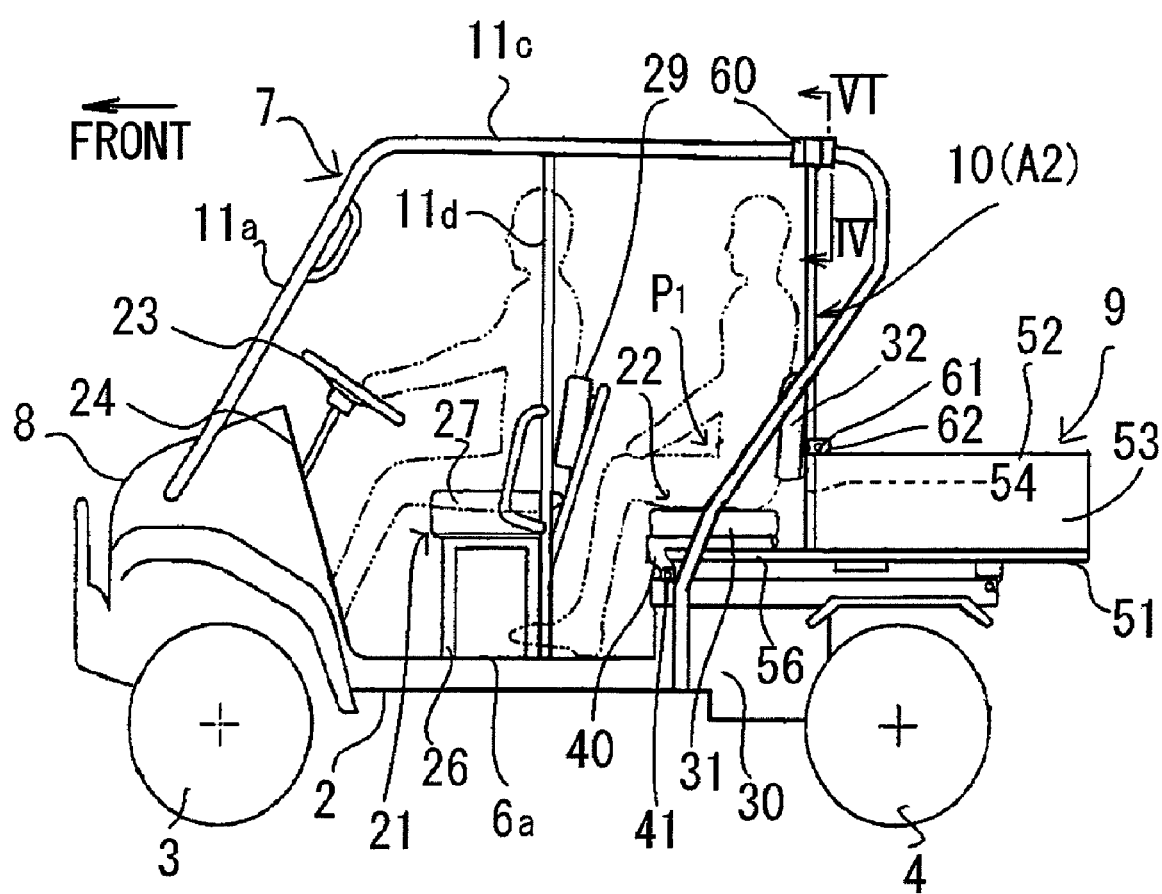
FIG. 2 is a left side view of the pick-up style utility vehicle of FIG. 1 when a cargo bed is not expanded.
Figure 3:
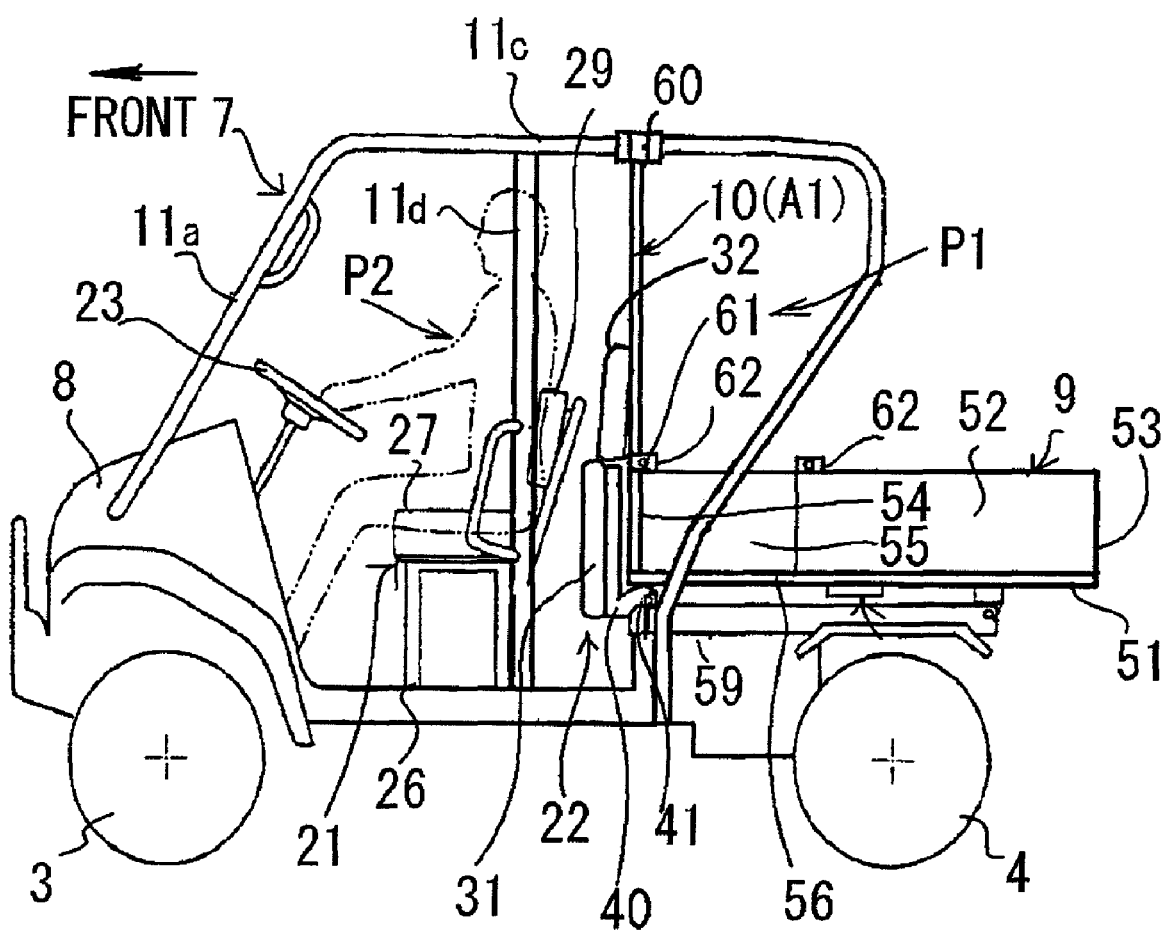
FIG. 3 is a left side view of the pick-up style utility vehicle of FIG. 1 when the cargo bed is expanded.

FIGS. 1 to 4 show a pick-up style utility vehicle with an expandable cargo bed according to a first embodiment of the present invention. The pick-up style utility vehicle can be changed between a 4 passengers transformation contracting a cargo bed 9 in a non-expanded state as shown in FIG. 2, and a 2 passengers transformation folding a rear seat 22 and expanding the cargo bed 9 in a front direction, as shown in FIG. 3. A configuration of the pick-up style utility vehicle will be described below in detail with reference to the drawings.

FIG. 1 is a perspective view of the pick-up style utility vehicle. A pick-up style utility vehicle 1 has a vehicle body 2 supported by a pair of right and left front wheels 3 and a pair of right and left rear wheels 4. A cabin frame 7 configuring a cabin 6 is provided in an intermediate portion above the vehicle body 2 in a front or rear direction. A hood 8 is provided in front of the cabin frame 7. The expandable cargo bed 9 is provided behind the cabin frame 7. A screen shield 10 partitioning the cargo bed 9 and a riding space is provided at a front end of the cargo bed 9 so as to be adjustable in a front or rear direction.

The cabin frame 7 surrounding the cabin 6 has a pair of right and left side frame members 11 formed in a U shape and made of a metal pipe, and a plurality of cross frame members 12 made of a metal pipe coupling the side frame members 11. Each of the side frame members 11 has a front side portion 11a extended in a rear direction and in an upward direction from near the right or left side portion of the hood 8, a rear side portion 11b extended in a substantially upward direction from the right or left side portion at the rear end of the cabin 6, an upper side portion 11c integrally coupling the upper end of the front side portion 11a and the upper end of the rear side portion 11b and extended in a front or rear direction, and an intermediate longitudinal portion 11d coupling the intermediate portion of the upper side portion 11c in a front or rear direction and a floor surface 6a.

A bench-shaped front seat 21 is installed in the front half of the cabin 6. The bench-shaped rear seat 22 is of a folding type and is installed in the rear half portion of the cabin 6. A dashboard (operating portion) 24 having a steering wheel 23 and the like is provided at the front end of the cabin 6.

FIG. 2 shows the state of the 4 passengers transformation. The bench-shaped front seat 21 has a seat leg 26 erected on the floor surface 6a of the cabin 6, a seat bottom 27 provided on the upper end face of the seat leg 26, and a backrest 29 fixed via a supporting stay, for example, to the intermediate vertical portion 11d. The bench-shaped front seat 21 is typically extended leftward and rightward to near the left and right ends of the cabin 6 so that two persons can be seated side by side.

A driver can be seated on one (e.g., left) seating area and a passenger can be seated on the other seating area. The bench-shaped rear seat 22 has a seat bottom 31 arranged on the upper side of a box 30 housing an engine (not shown), and a backrest 32. As same in the front seat 21, the seat bottom 31 and the backrest 32 are extended leftward and rightward to near the left and right ends of the cabin 6. With this configuration, two passengers can be seated side by side.

The seat bottom 31 of the rear seat 22 is fixed onto the upper surface of a supporting base 40. The front end of the supporting base 40 is rotatably supported at the front upper end of the box 30 via a hinge 41. The backrest 32 for the rear seat 22 is formed so as to be separated from the seat bottom 31 and is fixed onto the front surface of the lower half portion of the screen shield 10.

FIG. 3 shows the state in which the rear seat 22 is retracted from a rear riding space P1. The seat bottom 31 is rotated about the hinge 41 so as to be in a substantially vertical state. The backrest 32 for the rear seat 22 is moved forward together with the screen shield 10. The rear seat 22 is retracted so that the rear riding space P1 can be used as the forward expanded space of the cargo bed 9.

The configuration which can expand the cargo bed 9 will be described. In FIG. 3, the cargo bed 9 has, as a basic configuration, a stationary bottom plate 51, a pair of stationary side panels 52 provided substantially perpendicular to the stationary bottom plate 51 along the left and right ends of the stationary bottom plate 51, an openable and closeable gate type rear panel 53 provided at the rear end of the stationary bottom plate 51, and a front panel 54 which is position adjustable forward and rearward. In addition to these members, to expand the cargo bed 9 forward, the cargo bed 9 has a pair of left and right expandable side panels 55, and an expandable bottom plate 56 extended forward from the front end of the stationary bottom plate 51.

Figure 20:
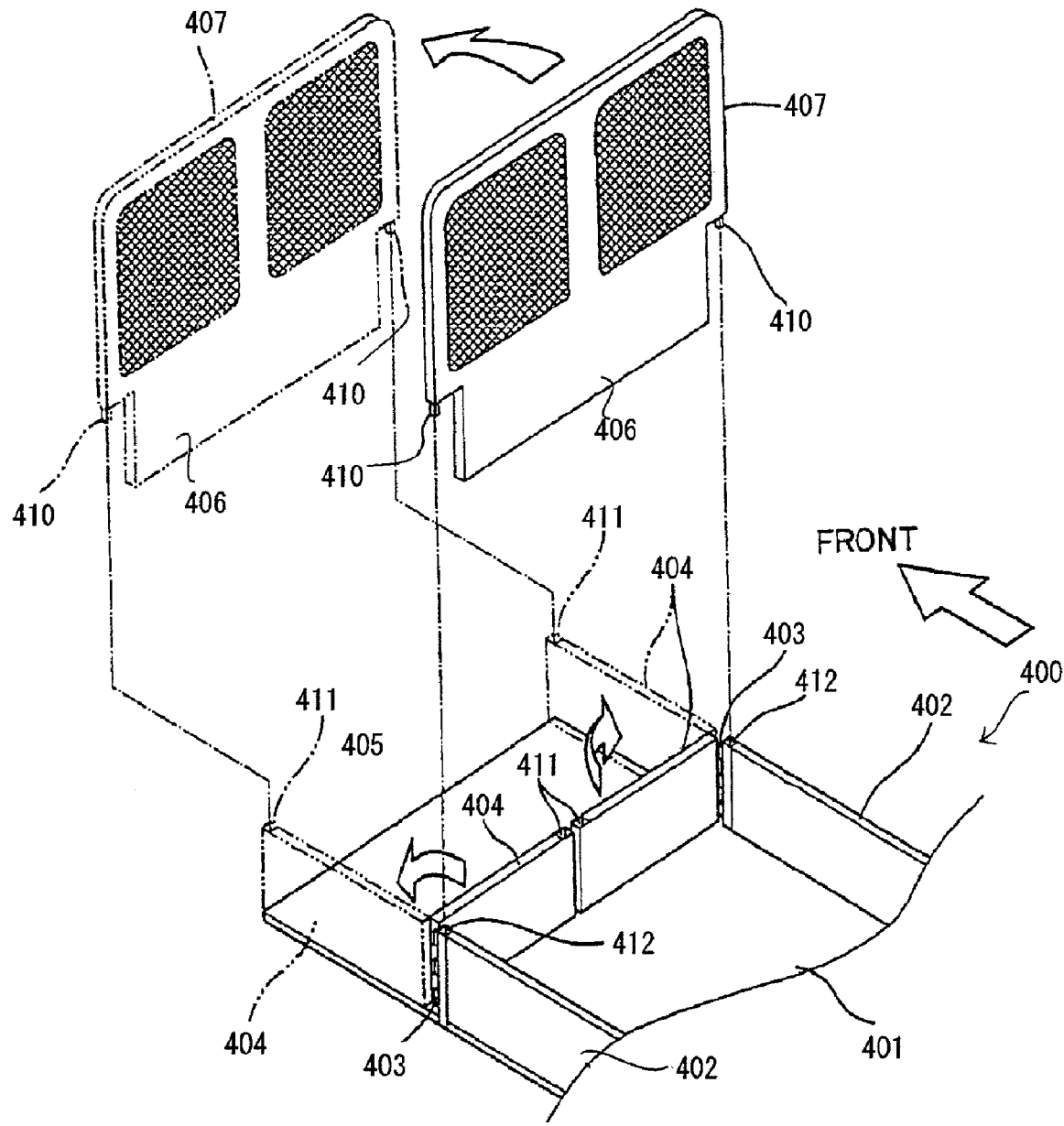
FIG. 20 is a perspective view of a related art.

According to the first embodiment, the expandable bottom plate 56 is integral with the stationary bottom plate 51 and is extended forward from the front end of the stationary bottom plate 51 on the same plane as the stationary bottom plate 51 into the rear riding space P1. The pair of expandable side panels 55 has the same configuration as that of the expandable side panels of the related art described in FIG. 20. Specifically, each of the expandable side panels 55 is rotatably supported at the front end of each of the stationary side panels 52 via a hinge and the position thereof can be changed between an expanded position in which the expandable side panel 55 is protruded forward from the front end of the stationary side panel 52, as shown in FIG. 3, and a non-expanded position in which the expandable side panel 55 is protruded inward in a vehicle width direction from the front end of the stationary side panel 52 as shown in FIG. 2. In the first embodiment, the front panel 54 is formed so as to be separated from the screen shield 10 and is position changeable between the expanded position shown in FIG. 2 and the non-expanded position shown in FIG. 3.

The configuration of the screen shield 10 will be described. As shown in FIG. 1, the screen shield 10 has a gate-shaped screen shield frame 10a made of metal or hard resin, and a net member 10b made of metal or resin and meshed in the screen shield frame 10a. A pair of left and right cylindrical slide members 60 is provided at the left and right ends of the upper end of the screen shield 10. Each of the slide members 60 is fittingly supported by each of the upper side members 11c on the left and right sides of the cabin frame 7 so as to be slidable forward and rearward. The slide member 60 is slid forward and rearward so that the screen shield 10 and the backrest 32 for the rear seat 22 are position changeable between a non-expanded position A2 in which the non-expanded cargo bed 9 and the rear riding space P1 are partitioned as shown in FIG. 2 and an expanded position A1 in which the expanded cargo bed 9 and a front riding space P2 are partitioned as shown in FIG. 3.

A pair of pins 61 for fixing is provided at the left and right ends of the lower end of the screen shield 10. Several fixed members 62 are provided at the front end of the stationary side panel 52 and the front end of the expandable side panel 55 of the cargo bed 9. Each of the fixed members 62 has an engaging hole that the pin 61 for fixing engages therein. The screen shield 10 is fixed in the non-expanded position A2 of FIG. 2 and the expanded position A1 of FIG. 3 by the pin 61 for fixing and the fixed member 62.

Figure 4:
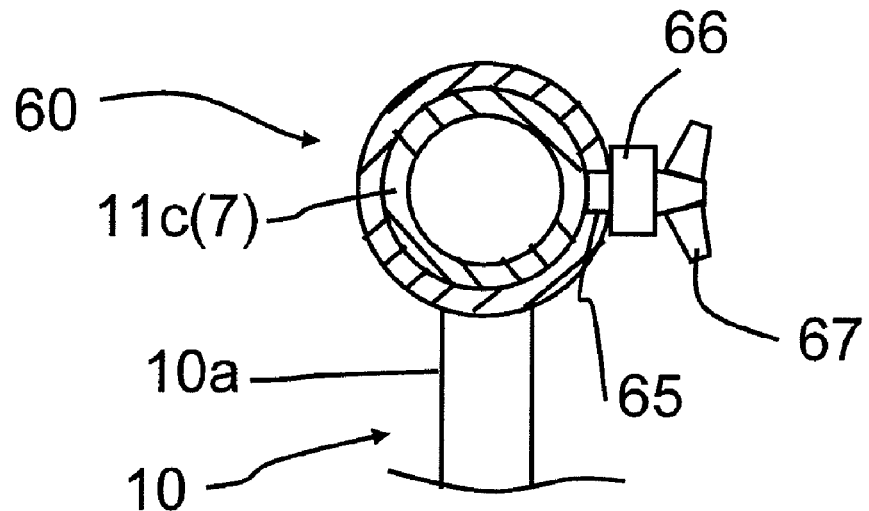
FIG. 4 is a sectional enlarged view taken along line IV-IV of FIG. 2.

FIG. 4 is a cross-sectional view of the slide member 60 of the screen shield 10. A bolt insertion hole 65 is formed in the slide member 60. A nut 66 having a female screw hole communicated with the bolt insertion hole 65 is fixed by welding. A bolt 67 for fixing is screwed into the nut 66. The bolt 67 for fixing is rotated to press the end of the bolt 67 into contact with the upper side member 11c. Therefore, the slide member 60 can be fixed in a desired position.

The operation of changing the 4 passengers transformation shown in FIG. 2 to the 2 passengers transformation shown in FIG. 3 and moving the screen shield 10 will be described.

In the 4 passengers transformation shown in FIG. 2, the supporting base 40 and the seat bottom 31 of the rear seat 22 are located on the upper side of the expandable bottom plate 56. The screen shield 10 and the backrest 32 for the rear seat 22 are located in the non-expanded position A2 corresponding to the front end of the cargo bed 9 in the non-expanded state. The lower end of the screen shield 10 is fixed to the stationary side panel 52 by the pins 61 for fixing and the fixed members 62 of the stationary side panel 52. As shown in FIG. 4, the slide member 60 at the upper end of the screen shield 10 is fixed to the upper side member 11c by the bolt 67 for fixing.

When the 4 passengers transformation is changed to the 2 passengers transformation, the seat bottom 31 of the rear seat 22 is rotated about the hinge 41 forward together with the supporting base 40 and is retracted into the space immediately behind the front seat 21 in a substantially erected state, as shown in FIG. 3.

The fixed state of the slide members 60 at the upper end of the screen shield 10 and the pins 61 at the lower end of the screen shield 10 are released to slide the slide members 60 forward. Thus, the screen shield 10 and the backrest 32 for the rear seat are integrally moved forward.

Each of the left and right expandable side panels 55 is opened and the front panel 54 is moved forward.

The pins 61 at the lower end of the screen shield 10 are fixed into the fixed members 62 at the front end of the expandable side panel 55. The slide members 60 at the upper end of the screen shield 10 are fixed to the upper side members 11c.

In the first embodiment, the screen shield 10 is separated from the front panel 54 and is supported by the upper portion of the cabin frame 7 so as to be slidable forward and rearward. Unlike the related art, the screen shield 10 need not be lifted and moved. Therefore, the expanding operation of the cargo bed 9 and the moving operation of the screen shield 10 can be easily performed by one operator.

When the 2 passengers transformation shown in FIG. 3 is changed to the 4 passengers transformation shown in FIG. 2 and the cargo bed 9 is contracted into the non-expanded state, the expanding operation may be reversed. Also in this case, the screen shield 10 need not be lifted and moved. Therefore, the contracting operation of the cargo bed 9 and the moving operation of the screen shield 10 can be easily performed by one operator.

Modification Example 1 of the First Embodiment

Figure 5:
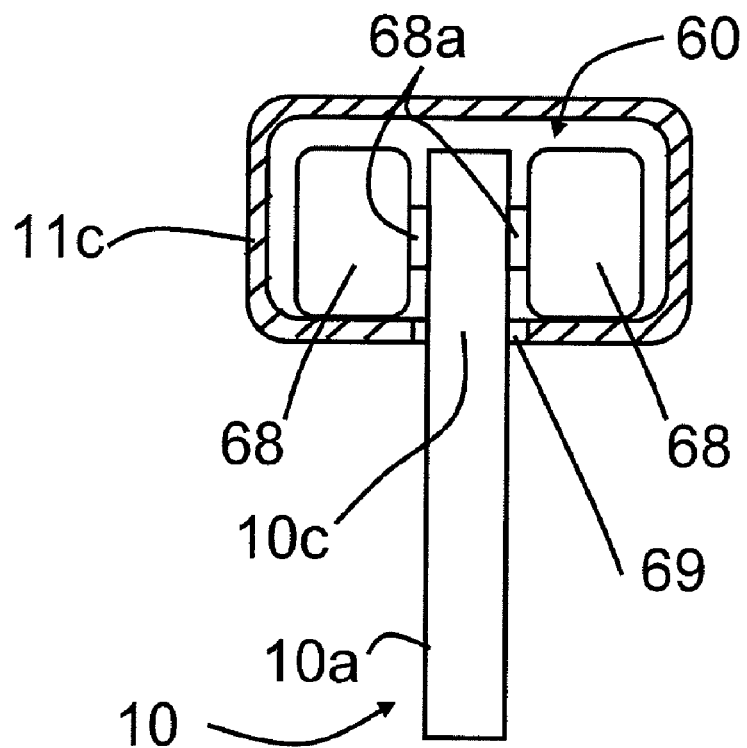
FIG. 5 is a sectional enlarged view similar to FIG. 4 according to modification example 1 of the first embodiment.

FIG. 5 is a modified example 1 of the first embodiment of the present invention. The modified example 1 has the same configuration as that of FIGS. 1 to 4 except for the configurations of the upper side member 11c of the cabin frame 7 and the slide member 60.

The cross section of the upper side member 11c of the cabin frame 7 is rectangular. A groove or slot 69 is formed in the lower wall of the upper side member 11c. A roller supporting portion 10c protruded upward is provided at the left or right end of the upper end of the screen shield 10. The roller supporting portion 10c passes through the groove 69 and is protruded into the upper side member 11c. A pair of rollers 68 is rotatably supported as the slide member 60 at the upper end of the roller supporting portion 10c via roller shafts 68a. Each of the rollers 68 is rotatably supported on the lower wall of the upper side member 11c.

According to the modified example 1, the screen shield 10 can be moved more easily forward and rearward. In addition, the roller 68 and the roller shaft 68a are protected by the upper side member 11c, thereby preventing rust due to rain or the like.

Modification Example 2 of the First Embodiment

Figure 6:
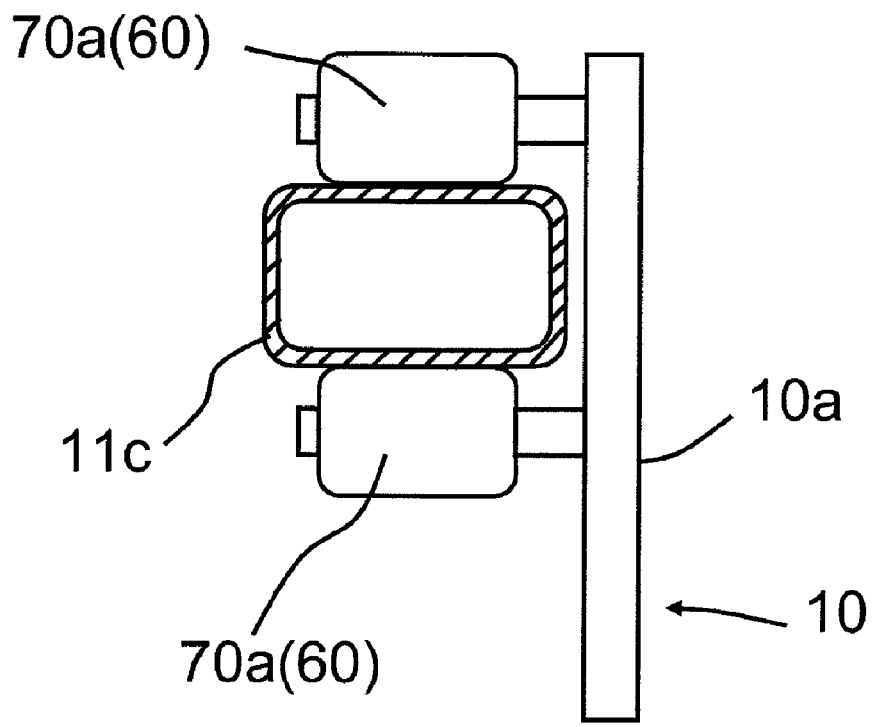
FIG. 6 is a sectional enlarged view similar to FIG. 4 according to modification example 2 of the first embodiment.

FIG. 6 shows a modified example 2 of the first embodiment of the present invention. The modified example 2 has the same configuration as that of FIGS. 1 to 4 except for the configurations of the upper side member 11c of the cabin frame 7 and the slide member 60.

The cross section of the upper side member 11c is rectangular. A pair of rollers 70a and 70b, spaced in an up-down direction, is rotatably supported as the slide member 60 at the left or right end of the upper end of the screen shield 10. The upper roller 70a is supported by the upper surface of the upper wall of the upper side member 11c. The lower roller 70b is abutted on the lower surface of the lower wall of the upper side member 11c.

According to the modified example 2, the screen shield 10 can be moved more easily forward and rearward. In addition, the rattling of the screen shield 10 up and down can be prevented.

Modification Example 3 of the First Embodiment

Figure 7:
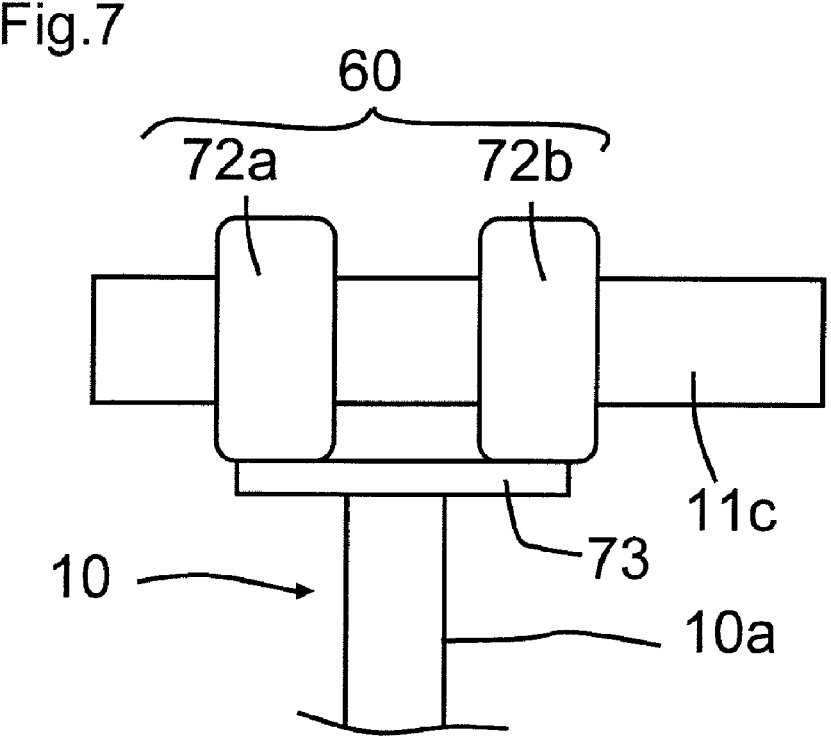
FIG. 7 is a sectional enlarged view similar to FIG. 4 according to modification example 3 of the first embodiment.

FIG. 7 shows a modified example 3 of the first embodiment of the present invention. The modified example 3 has the same configuration as that of FIGS. 1 to 4 except for the configuration of the slide member 60.

The slide member 60 has a pair of front and rear cylindrical bodies 72a and 72b arranged so as to be spaced in a front-rear direction. The lower ends of the cylindrical bodies 72a and 72b are coupled by a coupling plate 73. The coupling plate 73 is fixed to the upper end of the screen shield 10.

As described above, the slide member 60 is divided into the front and rear cylindrical bodies 72a and 72b. Therefore, vibration of the screen shield 10 forward and rearward can be prevented.

Second Embodiment

Figure 8:
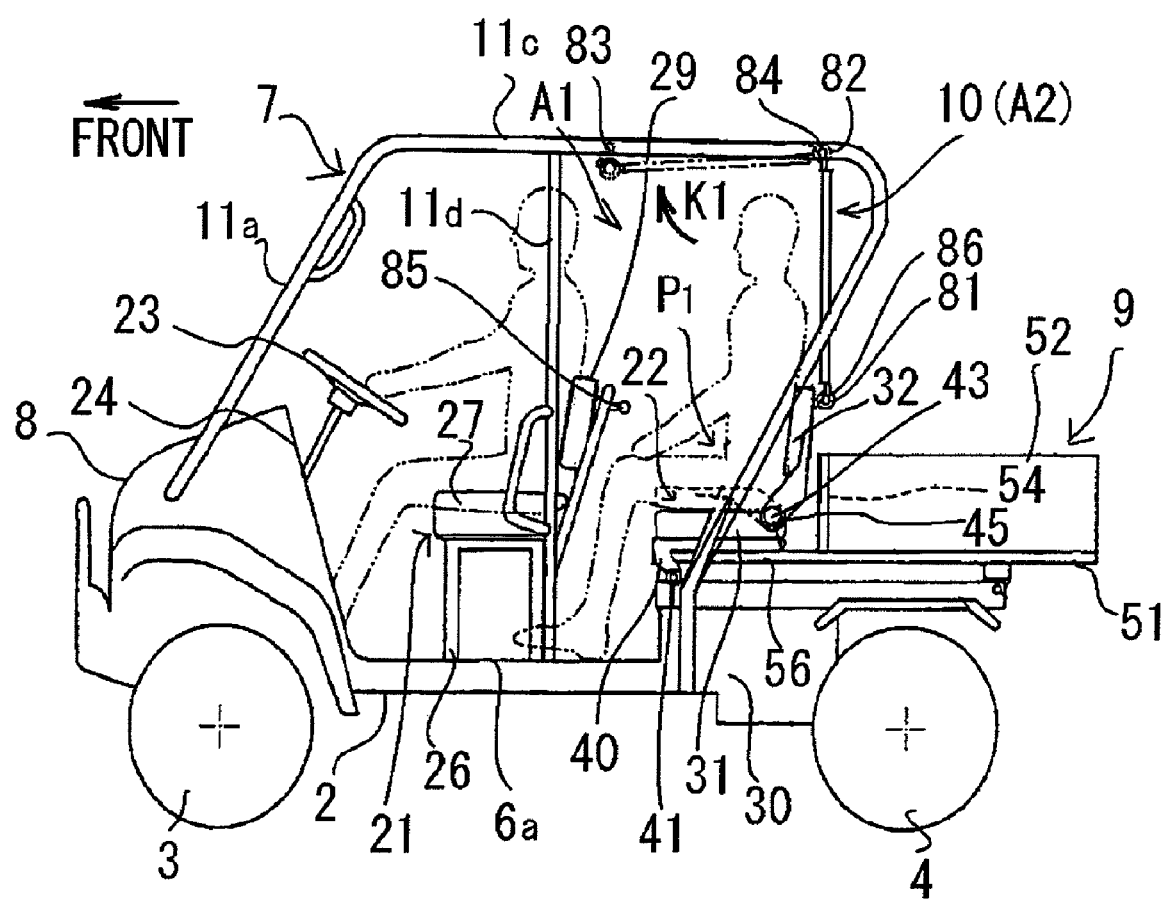
FIG. 8 is a left side view of a pick-up style utility vehicle according to a second embodiment of the present invention when the cargo bed is not expanded.
Figure 9:
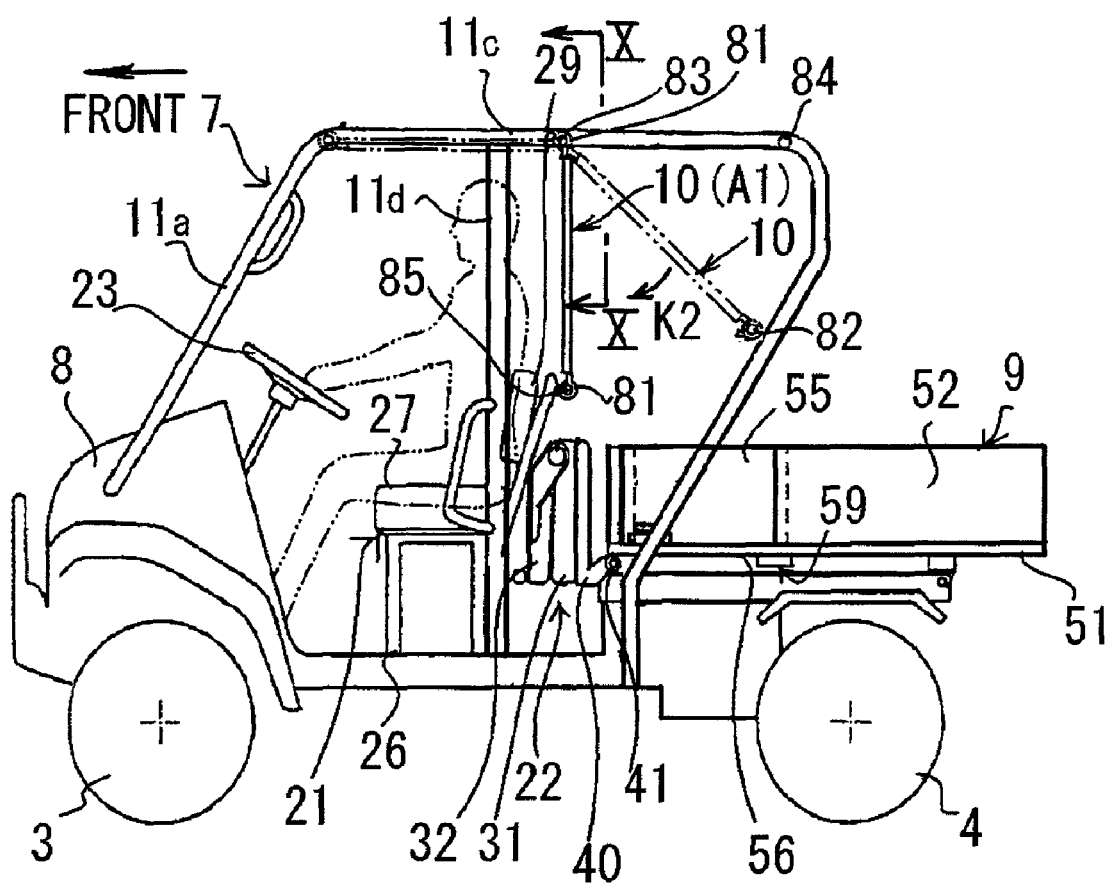
FIG. 9 is a left side view of the pick-up style utility vehicle of FIG. 8 when the cargo bed is expanded.
Figure 10:
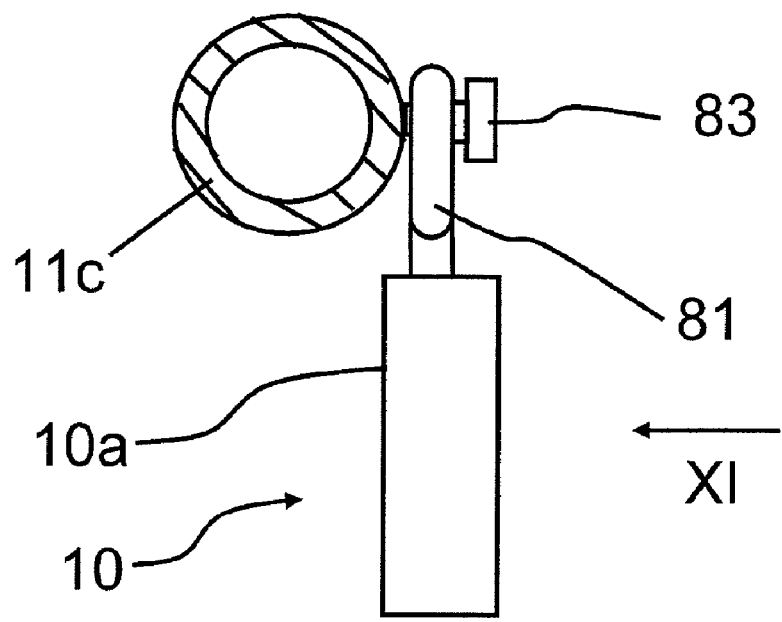
FIG. 10 is a sectional enlarged view taken along line X-X of FIG. 9.
Figure 11:
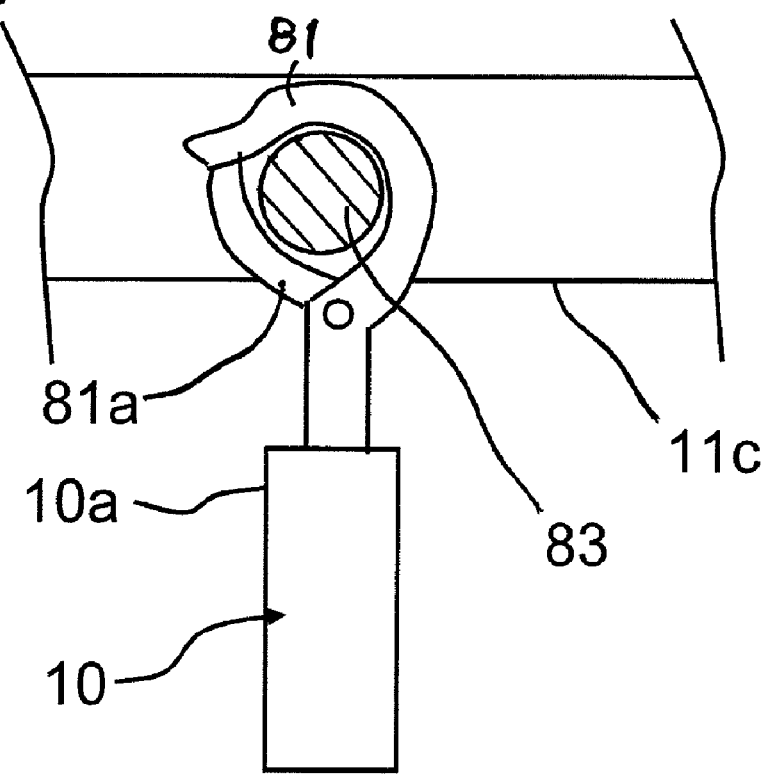
FIG. 11 is a diagram viewed in the direction of an arrow XI of FIG. 10.

FIGS. 8 to 11 show a second embodiment of the present invention, in which FIG. 8 is a left side view of the pick-up style utility vehicle when the cargo bed 9 is not expanded, FIG. 9 is a left side view of the pick-up style utility vehicle when the cargo bed 9 is expanded, FIG. 10 is a sectional enlarged view taken along line X-X of FIG. 9, and FIG. 11 is a diagram viewed in the direction of an arrow XI of FIG. 10.

In FIG. 8, the second embodiment has the same configuration as the first embodiment except for the supported configuration of the screen shield 10 by the cabin frame 7 and the configuration of the backrest 32 of the rear seat 22. Like components are indicated by like reference numerals.

In FIG. 8, the backrest 32 of the rear seat 22 is separated from the screen shield 10. The backrest 32 is rotatably coupled to the rear end of the seat bottom 31 via a hinge 43.

The screen shield 10 has a pair of first engaging portions 81 provided at the left and right ends of one end (the lower end of FIG. 8) perpendicular to a vehicle width direction and a pair of second engaging portions 82 provided at the other end (the upper end of FIG. 8) perpendicular to a vehicle width direction. Engaged portions 83 and 84 are provided on the upper side member 11c of the cabin frame 7 in the expanded position A1 and the non-expanded position A2 of the screen shield 10. Engaged portions 85 and 86 are provided on the backrest 29 of the front seat 21 and the backrest 32 of the rear seat 22.

FIG. 10 is a sectional enlarged view of the first engaging portion 81 of the screen shield 10 in the expanded position A1 and the first engaged portion 83 of the cabin frame 7. FIG. 11 is a diagram viewed in the direction of an arrow XI of FIG. 10. In FIG. 11, the first engaging portion 81 of the screen shield 10 is formed in a hook shape. A lever portion 81a for preventing dropping is rotatably provided on the first engaging portion 81.

In FIG. 10, the first engaged portion 83 is a flanged pin and is engaged by the first engaging portion 81, which has a hook shape.

Like the first engaging portion 81 and the first engaged portion 83, the second engaging portion 82 of the screen shield 10 and the second engaged portion 84 of the cabin frame 7 shown in FIGS. 8 and 9 are formed by a hook and a pin. The engaged portion 85 of the backrest 29 of the front seat 21 and the engaged portion 86 of the backrest 32 of the rear seat 22 are the same pins as the first and second engaged portions 83 and 84.

The operation of changing the 4 passengers transformation shown in FIG. 8 to the 2 passengers transformation shown in FIG. 9 and moving the screen shield 10 will be described.

In the 4 passengers transformation shown in FIG. 8, the second engaging portion 82 at the upper end of the screen shield 10 engages the second engaged portion 84 of the upper side member 11c of the cabin frame 7, and the first engaging portion 81 at the lower end of the screen shield 10 engages the engaged portion 86 of the backrest 32 of the rear seat 22.

When the 4 passengers transformation is changed to the 2 passengers transformation, the first engaging portion 81 of the screen shield 10 disengages from the engaged portion 86 of the backrest 32 of the rear seat 22 and the backrest 32 is rotated about the hinge 43 so as to be overlapped with the seat bottom 31. The seat bottom 31 and the backrest 32 of the rear seat 22 are rotated about the hinge 41 forward together with the supporting base 40 and as shown in FIG. 9, are retracted in the space immediately behind the front seat 21 in a substantially erected state.

As indicated by an alternate long and two short dashed line of FIG. 8, the screen shield 10 is rotated about the second engaged portion 84 forward and upward (in an arrow K1 direction) and the first engaging portion 81 engages the first engaged portion 83 of the cabin frame 7.

As indicated by an alternate long and two short dashed line of FIG. 9, the second engaging portion 82 of the screen shield 10 disengages from the second engaged portion 84 of the cabin frame 7 and the screen shield 10 is rotated about the first engaged portion 83 forward and downward (in an arrow K2 direction). The second engaging portion 82 of the screen shield 10 engages the engaged portion 85 of the backrest 29 of the front seat 21.

When the 4 passengers transformation is changed to the 2 passengers transformation, the back surface of the seat bottom 31 (the back surface of the supporting base 40) of the retracted rear seat 22 can be used in place of the front panel of the cargo bed 9.

In the embodiment, unlike the related art, the screen shield 10 need not be lifted and moved. Thus, the expanding operation of the cargo bed 9 and the moving operation of the screen shield 10 can be easily performed by one operator.

When the 2 passengers transformation shown in FIG. 9 is changed to the 4 passengers transformation shown in FIG. 8 and the cargo bed 9 is contracted into the non-expanded state, the expanding operation may be reversed. Also in this case, the screen shield 10 need not be lifted and moved. Thus, the contracting operation of the cargo bed 9 and the moving operation of the screen shield 10 can be easily performed by one operator.

Modification Example of the Second Embodiment

Figure 12:
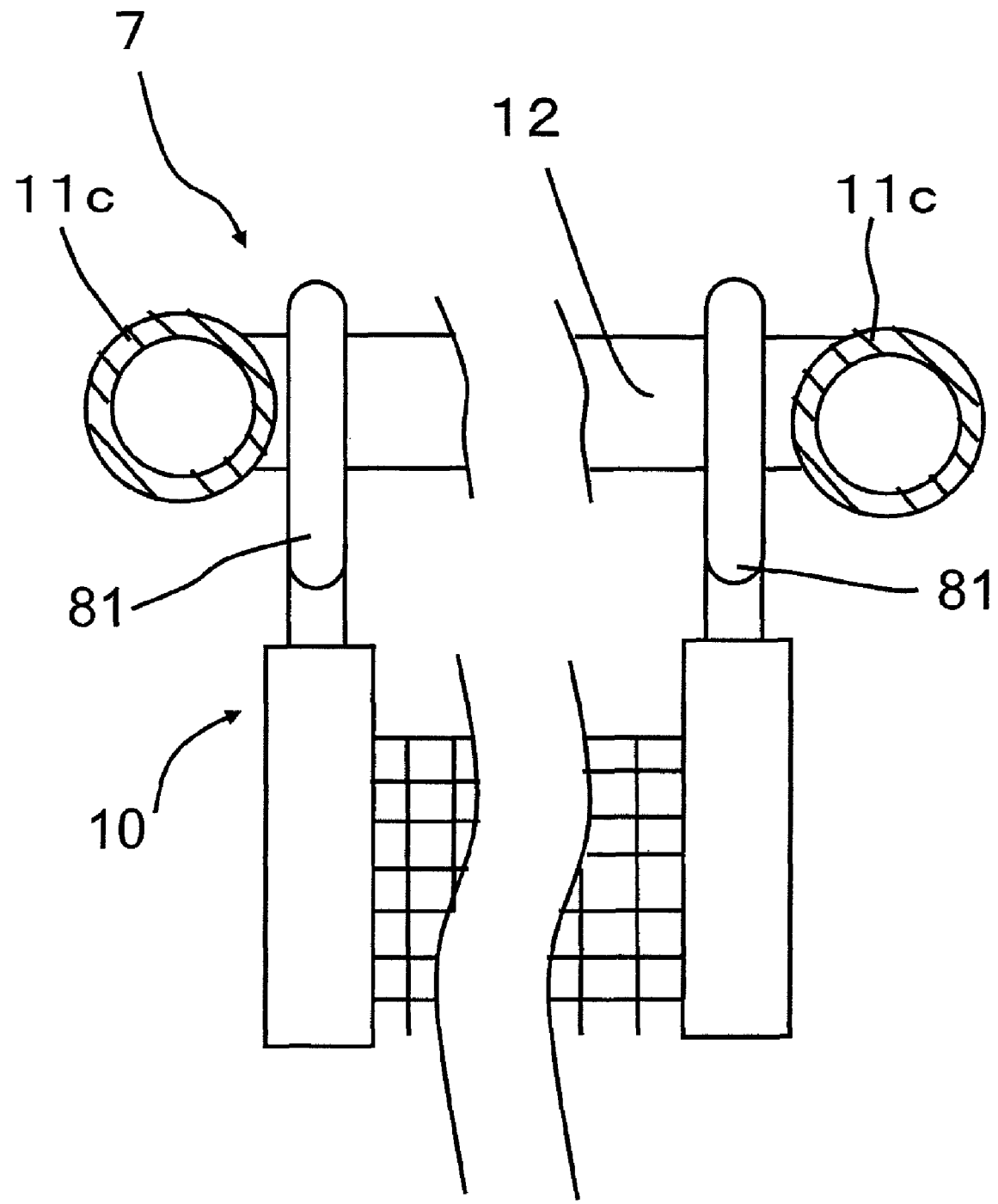
FIG. 12 is a rear schematic diagram of a screen shield according to a modification example of the second embodiment.

FIG. 12 shows a modified example of the second embodiment. The modified example of the second embodiment has the same configuration as that of FIGS. 8 to 11 except that as the first engaged portion 83 and the second engaged portion 84 (not shown) provided on the cabin frame 7, the cross member 12 of the cabin frame 7 is used.

According to the modified example, the components for the first and second engaged portions can be omitted.

In the embodiment, as indicated by an alternate long and two short dashed line of FIG. 8, the first and second engaging portions 81 and 82 of the screen shield 10 engage the first and second engaged portions 83 and 84 of the upper side member 11c, respectively. Thus, the screen shield 10 can be held in a fallen state upward of the rear riding space P1. Therefore, the screen shield 10 can be used as a roof.

Third Embodiment

Figure 13:
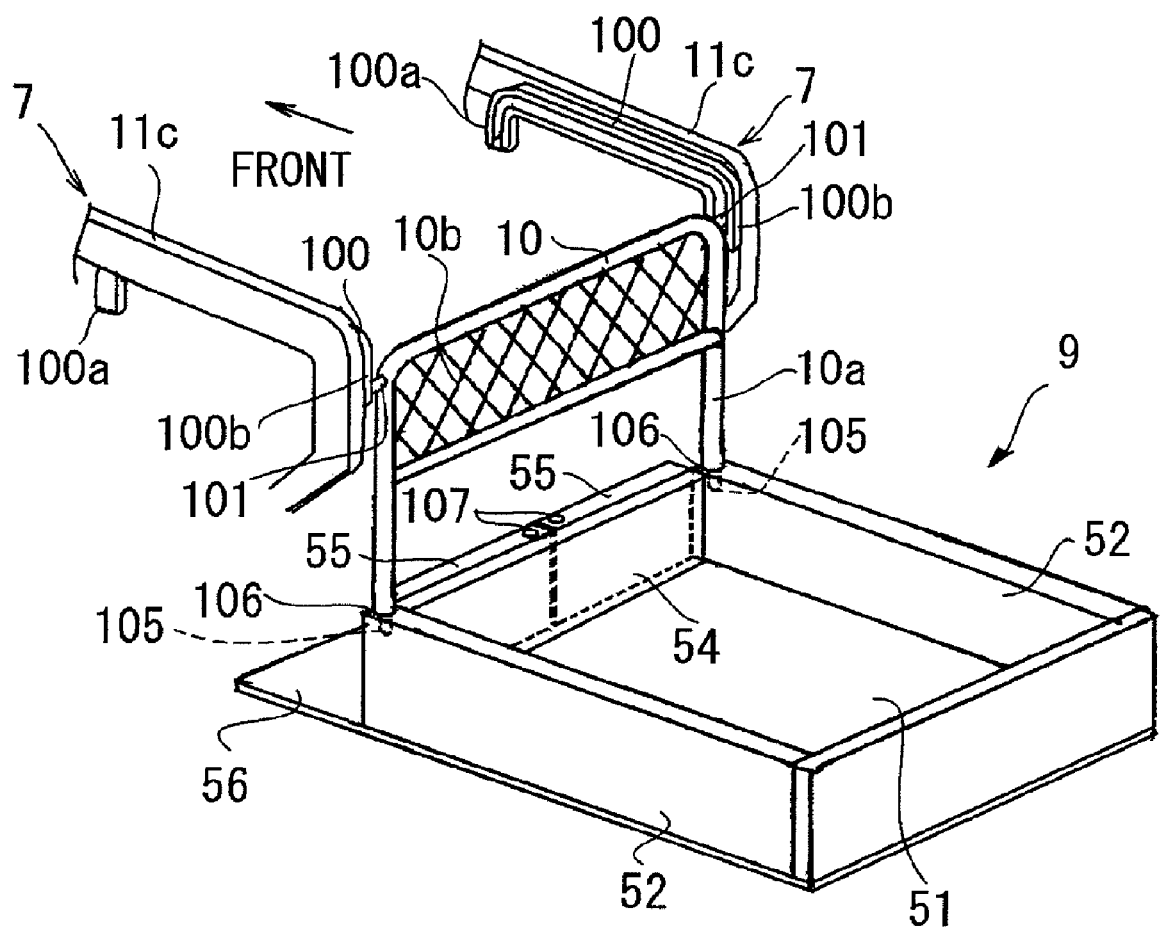
FIG. 13 is a schematic perspective view of a cargo bed and a screen shield of a pick-up style utility vehicle according to a third embodiment of the present invention.
Figure 14:
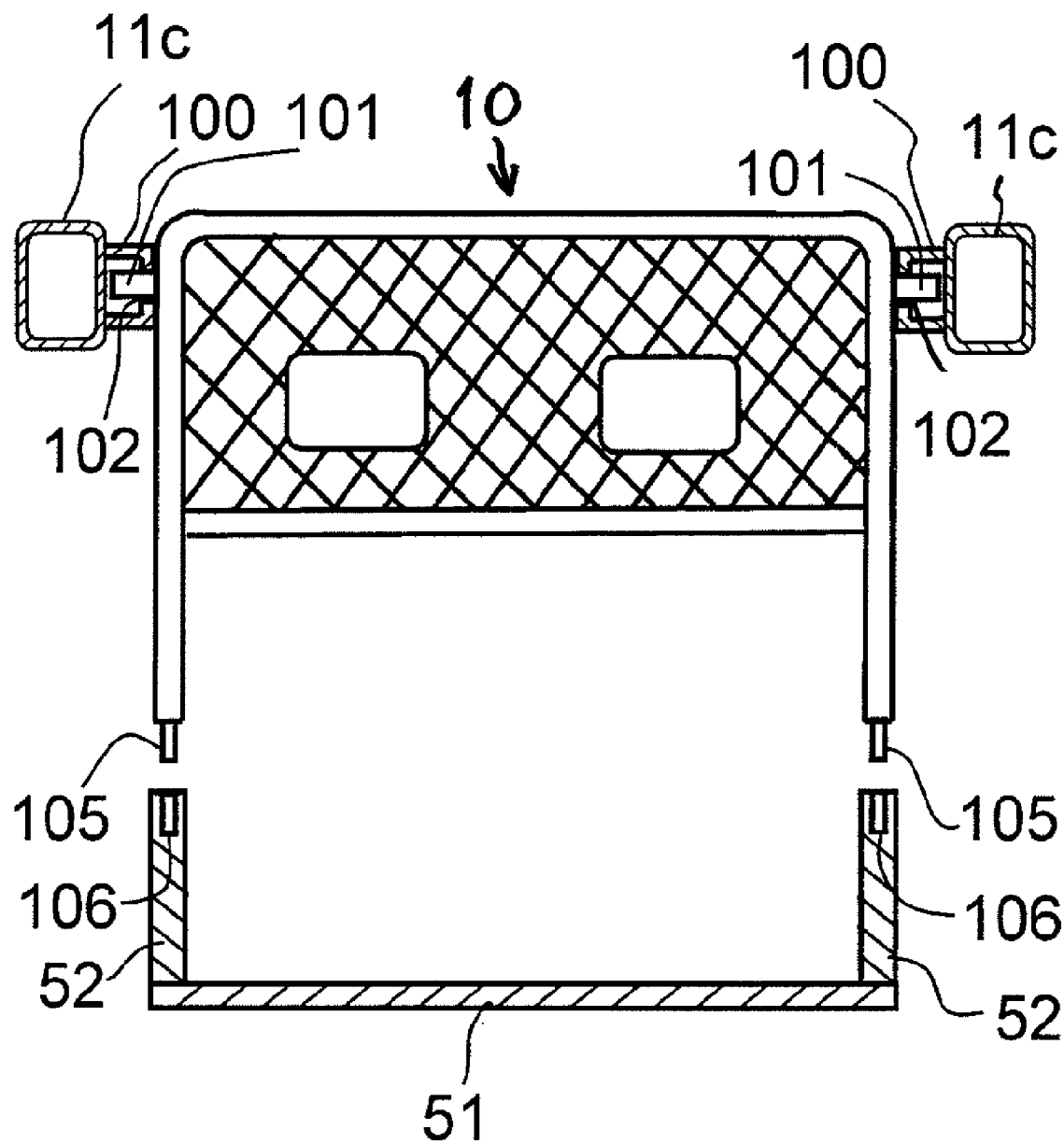
FIG. 14 is a rear view of the screen shield of FIG. 13.

FIGS. 13 and 14 show a third embodiment of the present invention, in which FIG. 13 is a perspective view of the non-expanded cargo bed 9 and the screen shield 10, and FIG. 14 is a rear view of the screen shield 10 which is being moved.

In FIG. 13, guide rails 100 are provided on the upper side members 11c on the left and right sides of the cabin frame 7, and slide pins 101 engaging the guide rails 100 are provided at the left and right ends of the upper end of the screen shield 10.

Each of the guide rails 100 is provided inside of the upper side member 11c of the cabin frame 7 in a vehicle width direction so as to be extended forward and rearward. Positioning portions 100a and 100b extended downward are provided at the front end and the rear end of the guide rail 100.

In FIG. 14, the sectional shape of each of the guide rails 100 is formed in a C shape having a groove 102 for pin insertion. The slide pin 101 of the screen shield 10 is inserted into the guide rail 100 via the groove 102 for pin insertion.

Pins 105 for fixing protruded downward are provided at the left and right ends of the lower end of the screen shield 10. A pin hole 106 into which each of the slide pins 105 can be inserted is provided at the front end of the stationary side panel 52. As shown in FIG. 13, a pin hole 107 into which the slide pin 105 can be inserted is provided at the end of each the expandable side panels 55.

The third embodiment has the same configuration as that of FIGS. 1 to 4 except for the above configuration. Like components are indicated by like reference numerals.

The operation of changing 4 passengers transformation shown in FIG. 13 to the 2 passengers transformation and moving the screen shield 10 will be described.

In the 4 passengers transformation shown in FIG. 13, each of the slide pins 101 at the upper end of the screen shield 10 is held at the lower end of the positioning portion 100b at the rear end of each of the guide rails 100, and each of the pins 105 for fixing at the lower end of the screen shield 10 engages the pin hole 106 at the front end of each of the stationary side panels 52.

When the 4 passengers transformation is changed to the 2 passengers transformation, the pair of expandable side panels 55 is rotated forward. The screen shield 10 is moved upward along the positioning portions 100b at the rear ends of the guide rails 100. Therefore, the pins 105 at the lower end of the screen shield 10 are pulled out from the pin holes 106 of the stationary side panels 52.

The slide pins 101 at the upper end of the screen shield 10 are moved forward along the guide rails 100 to move the screen shield 10 forward.

When the screen shield 10 is moved into the expanded position A1, the slide pins 100 at the upper end of the screen shield 10 are lowered along the positioning portions 100a at the front ends of the guide rails 100. Therefore, the screen shield 10 is positioned into the expanded position A1. The screen shield 10 is fixed into the expanded position A1 by inserting the pins 105 at the lower end of the screen shield 10 into the pin holes 107 at the front ends of the expandable side panels 55.

In the embodiment, unlike the related art, the screen shield 10 need not be lifted and moved. Thus, the expanding operation of the cargo bed 9 and the moving operation of the screen shield 10 can be easily performed by one operator.

When the 2 passengers transformation is changed to the 4 passengers transformation shown in FIG. 13 and the cargo bed 9 is contracted into the non-expanded state, the expanding operation may be reversed. Also in this case, the screen shield 10 need not be lifted and moved. Thus, the contracting operation of the cargo bed 9 and the moving operation of the screen shield 10 can be easily performed by one operator.

Modification Example 1 of the Third Embodiment

Figure 15:
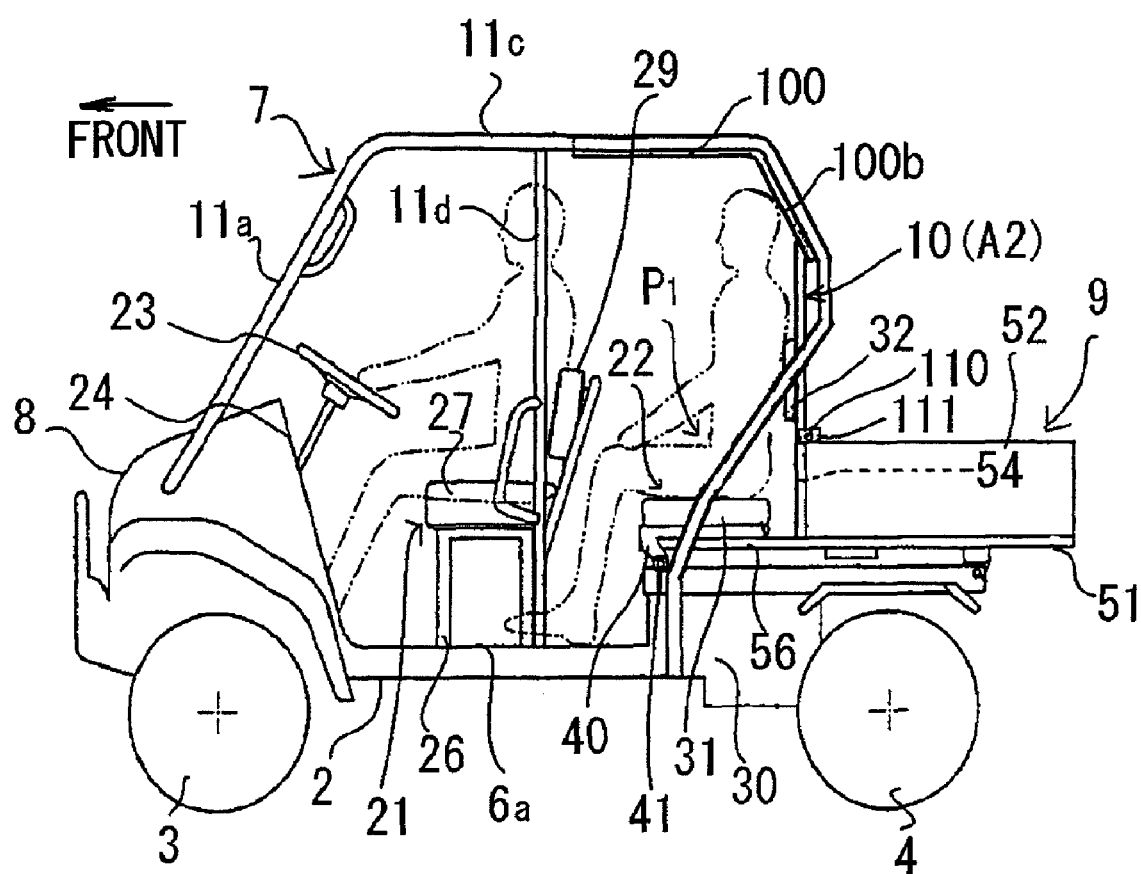
FIG. 15 is a left side view of a pick-up style utility vehicle of modification example 1 of the third embodiment of the present invention when the cargo bed is not expanded.
Figure 16:
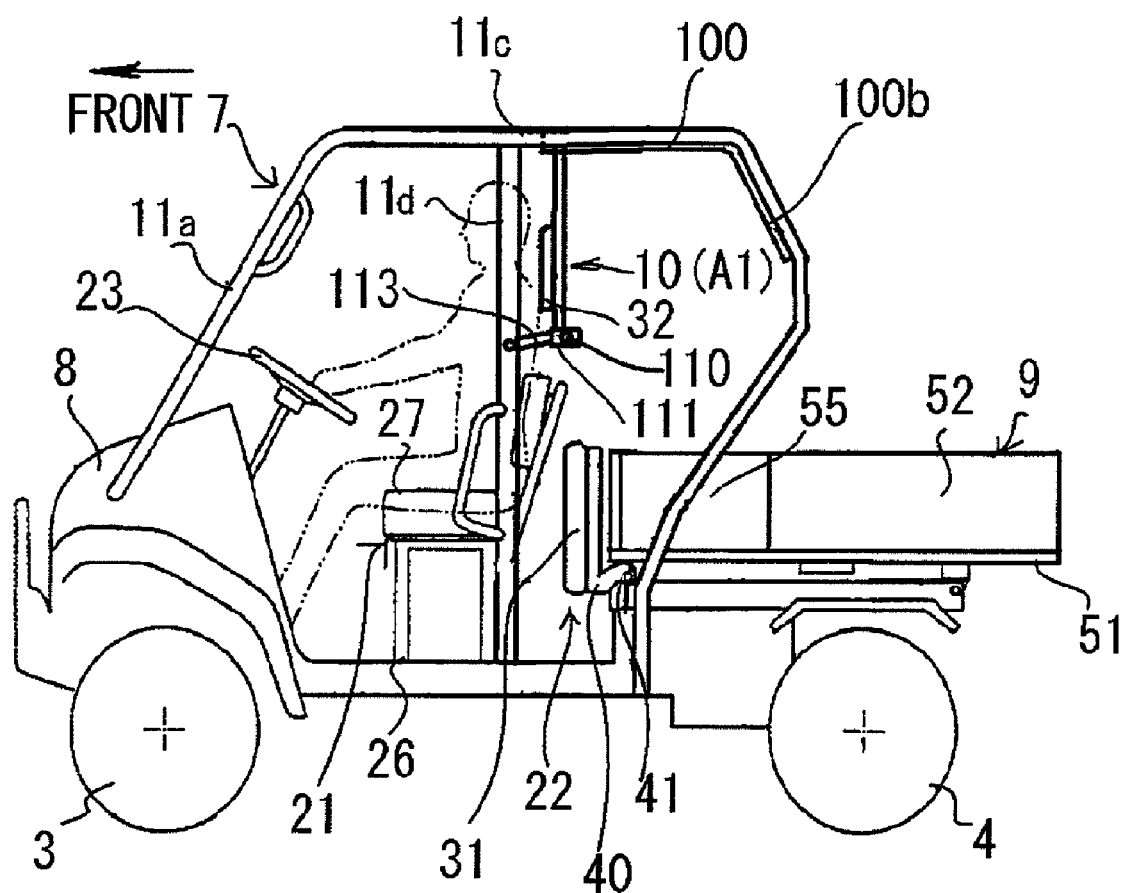
FIG. 16 is a left side view of the pick-up style utility vehicle of FIG. 15 when the cargo bed is expanded.
Figure 17:
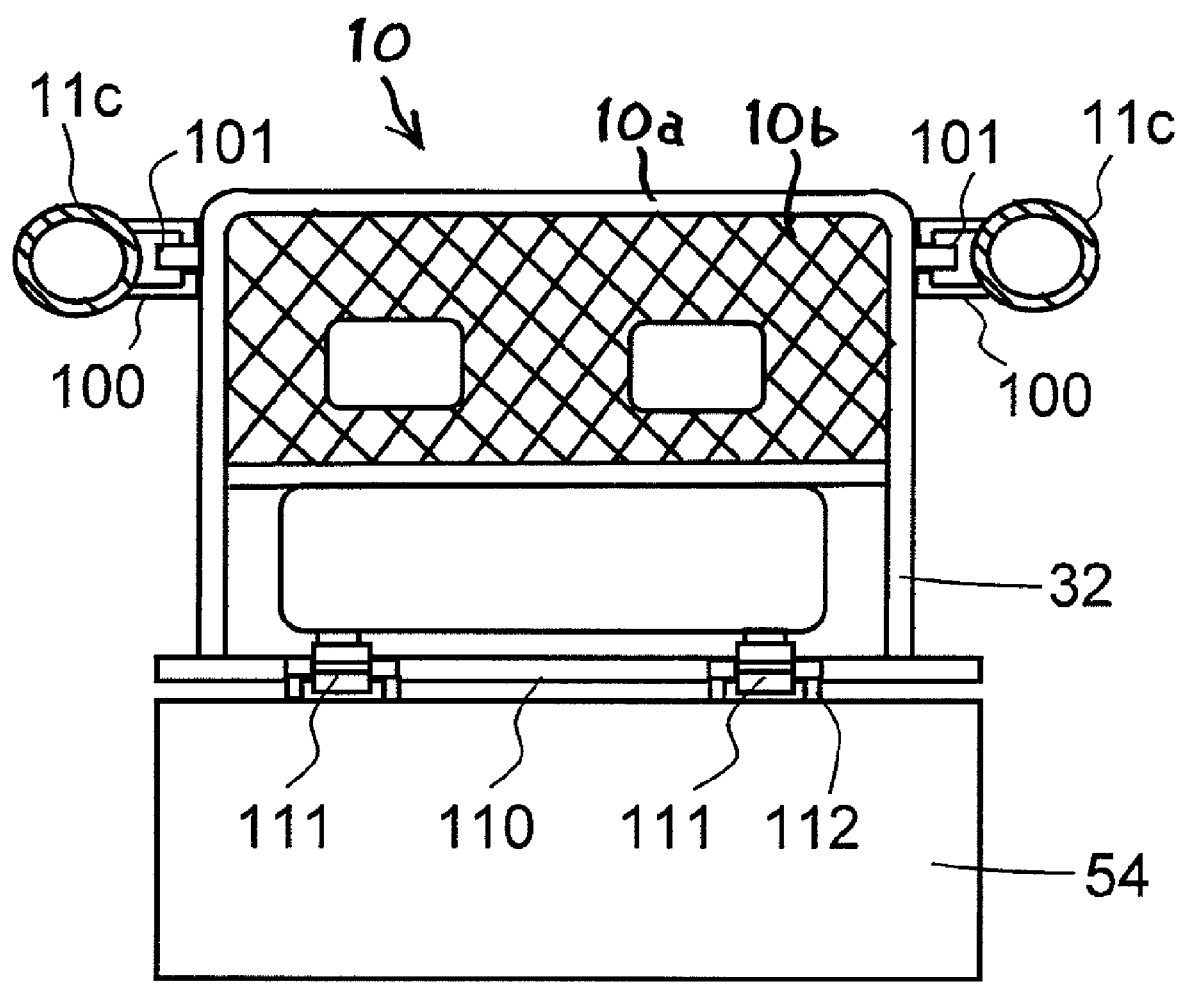
FIG. 17 is a front view of the screen shield of FIG. 16.

FIGS. 15 to 17 show a modified example 1 of the third embodiment. Like the third embodiment, the guide rails 100 are provided on the cabin frame 7 and the pins 101 are provided at the left and right ends of the upper end of the screen shield 10. The following configurations (a) and (b) are different from the third embodiment.

(a) The positioning portion 100b extended downward is formed at the rear end of the guide rail 100, while the positioning portion extended downward is not formed at the front end of the guide rail 100.

(b) The backrest 32 for the rear seat 22 is provided on the front surface of the lower half portion of the screen shield 10. The backrest 32 is movable forward and rearward integrally with the screen shield 10.

By the configurations (a) and (b), as shown in FIG. 16, when the screen shield 10 is moved from the non-expanded position A2 to the expanded position A1, the screen shield 10 is raised so as to be located above the backrest 29 of the front seat 21. The backrest 32 for the rear seat can be used as a headrest for the front seat 21.

As shown in FIG. 17, a bar 110 over substantially the entire width of the screen shield 10 in a vehicle width direction is provided at the lower end of the screen shield 10. A pair of left and right clamps 111 for fixing the screen shield are provided on the bar 110.

Each of the clamps 111 detachably holds a ring member 112 provided at the upper end of the front panel 54 of the cargo bed 9. With this configuration, the screen shield 10 can be fixed to the front panel 54.

As shown in FIG. 16, when the screen shield 10 is moved into the expanded position A1, the clamp 111 holds a ring 113 provided on the intermediate vertical portion 11d of the cabin frame 7 so that the screen shield 10 is fixed into the expanded position A1.

Modification Example 2 of the Third Embodiment

Figure 18:
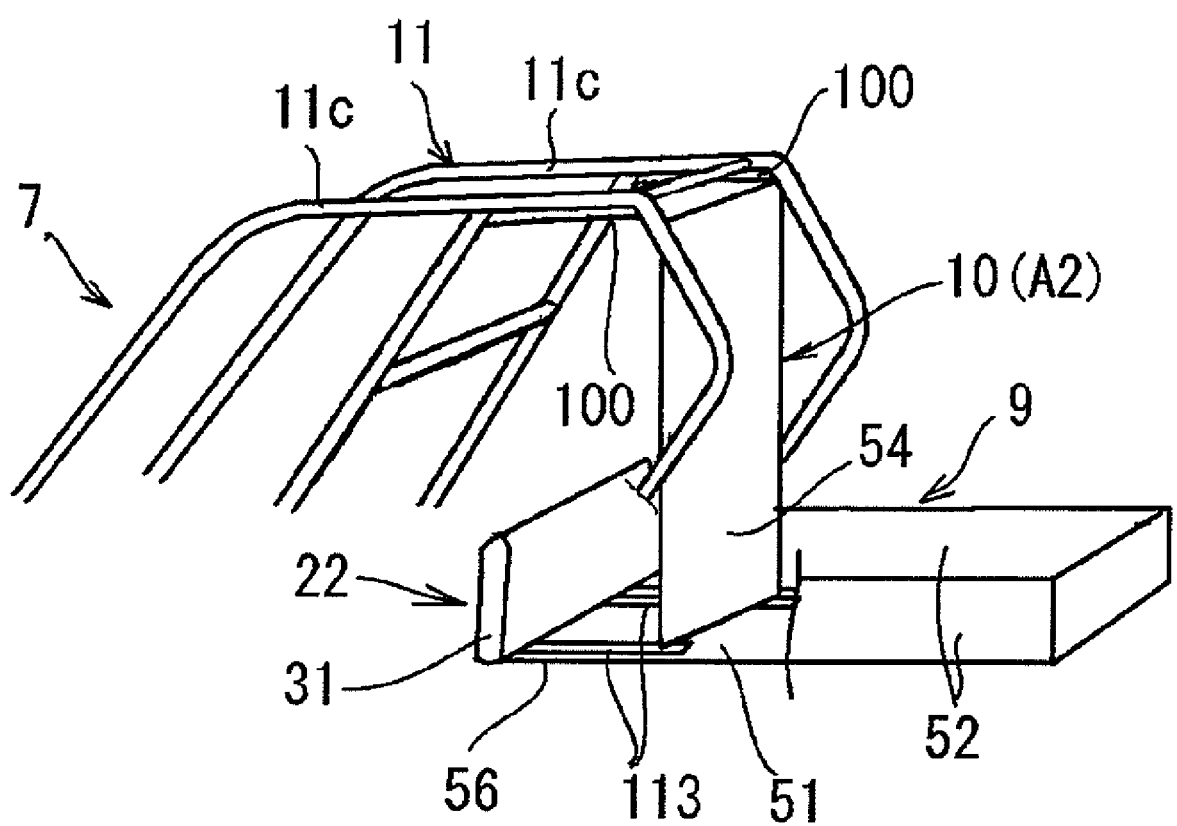
FIG. 18 is a perspective view of a cargo bed and a screen shield of modification example 2 of the third embodiment of the present invention.

FIG. 18 shows a modified example 2 of the third embodiment. Like the third embodiment, the guide rails 100 are provided on the cabin frame 7 and the pair of slide pins (not shown) are provided at the upper end of the screen shield 10. The following configurations (a) and (b) are different from the third embodiment.

(a) The positioning portions extended downward are not formed at the front end and the rear end of each of the guide rails 100.

(b) The front panel 54 of the cargo bed 9 is formed integrally with the screen shield 10 so that the front panel 54 is moved forward and rearward integrally with the screen shield 10. The lower end of the front panel 54 is slid forward and rearward on the pair of rails 113 provided on the expandable bottom plate 56 of the cargo bed 9.

Fourth Embodiment

Figure 19:
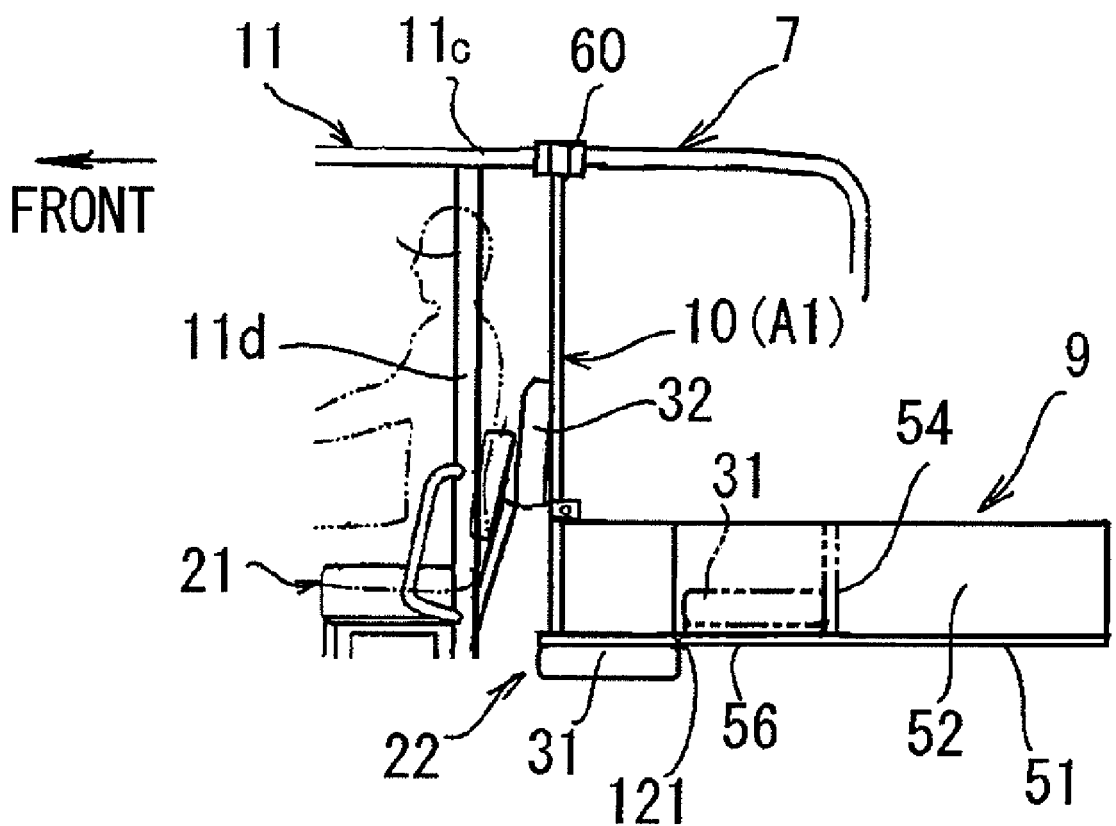
FIG. 19 is a left side view of a body portion of a pick-up style utility vehicle according to a fourth embodiment of the present invention.

FIG. 19 shows a fourth embodiment. Like the first embodiment, the pair of cylindrical slide members 60 provided at the upper end of the screen shield 10 are fitted onto the upper side member 11c of the cabin frame 7 so as to be movable forward and rearward. In addition to this configuration, when the cargo bed 9 is expanded, the back surface of the seat bottom 31 of the rear seat 22 is used as the extended portion of the expandable bottom plate 56 of the cargo bed 9.

The front end of the seat bottom 31 of the rear seat 22 is rotatably supported at the front end of the expandable bottom plate 56 by a hinge 121. When the cargo bed 9 is not expanded, as indicated by an alternate long and two short dashed line of FIG. 19, the seat bottom 31 is located on the upper side of the expandable bottom plate 56. When the cargo bed 9 is expanded, the seat bottom 31 is rotated 180° forward so that the back surface of the seat bottom 31 is substantially flush with the expandable bottom plate 56 of the cargo bed 9, as indicated by a solid line, and is used as the extended portion of the expandable bottom plate 56.

In the embodiment, the lower end of the front panel 54 of the cargo bed 9 is rotatably supported at the front end of the stationary bottom plate 51 by a hinge, and when the cargo bed 9 is expanded, the front panel 54 is fallen forward and can be used as the expandable bottom plate 56 of the cargo bed 9.

According to the embodiment, the cargo bed 9 can be expanded forward of the expandable bottom plate 56.

Other Embodiments (1) As fixing means of the screen shield 10, in addition to the above means, various fixing means such as a latch mechanism and a magnet mechanism can be used.

(2) The present invention is not limited to the configurations of the above embodiments and includes various modification examples contemplated in the scope without departing from the contents described in the scope of the claims.

What is claimed is:
1. A pick-up style utility vehicle comprising:
a cabin frame having a plurality of frame members made of pipe, the frame members including an upper right side member and an upper left side member;
a front seat and a rear seat surrounded by the cabin frame; and
a cargo bed in this order from a front of the vehicle;
the pick-up style utility vehicle further comprising a screen shield partitioning the cargo bed and a riding space in front of the cargo bed,
the cargo bed being changeable between an expanded state in which the cargo bed is expanded into the riding space of the rear seat and a non-expanded state not occupying the riding space of the rear seat; wherein:
the screen shield has right and left slide members on an upper portion of the screen shield,
the upper right and left side members of the cabin frame extend in front and rear directions of the vehicle, and
the right and left slide members are slidably supported by the upper right and left side members of the cabin frame so that the screen shield is changeable between an expanded position in which the cargo bed in the expanded state and the riding space in front of the cargo bed are partitioned and a non-expanded position in which the cargo bed in the non-expanded state and the riding space in front of the cargo bed are partitioned.
2. The pick-up style utility vehicle according to claim 1, wherein the upper side members of the cabin frame are circular in cross-section, and the screen has right and left cylindrical slide members slidably fitting on outer surfaces of the upper side members of the cabin frame.
3. The pick-up style utility vehicle according to claim 1, wherein:
the upper side members of the cabin frame are rectangular in cross-section and include lower walls having slots extending in front and rear directions;
the slide members of the screen shield has right and left rollers; and
the rollers are inserted in the upper side members of the cabin frame and supported on lower walls of the upper side members.

* * * * *